Thos. S. Disston,
Mode of Manufacturing Concavo-convex Circular Saws.

No. 109881

Patented Dec 6 1870

United States Patent Office.

THOMAS S. DISSTON, OF PHILADELPHIA, PENNSYLVANIA, ASSIGNOR TO HIMSELF AND HENRY DISSTON & SON, OF SAME PLACE.

Letters Patent No. 109,881, dated December 6, 1870.

IMPROVEMENT IN PROCESS FOR MAKING CONCAVE CIRCULAR SAWS.

The Schedule referred to in these Letters Patent and making part of the same.

I, THOMAS S. DISSTON, of Philadelphia, county of Philadelphia, State of Pennsylvania, have invented a Mode of Manufacturing Concavo-convex Circular-Saw Blades, of which the following is a specification.

Nature and Object of the Invention.

My invention consists of a mode or process, fully described hereafter, of manufacturing concavo-convex circular-saw blades, the said process being much more economical than the plan of hammering the blades to the desired shape, as heretofore practiced, and the blades themselves being more uniformly true than ordinary blades of this class.

Description of the Accompanying Drawing.

Figure 1:
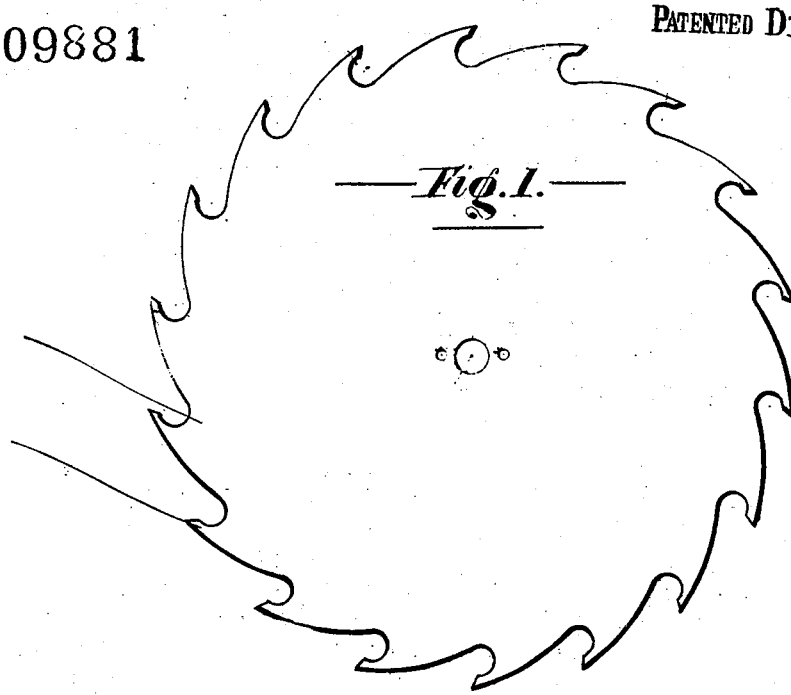
Figure 2:
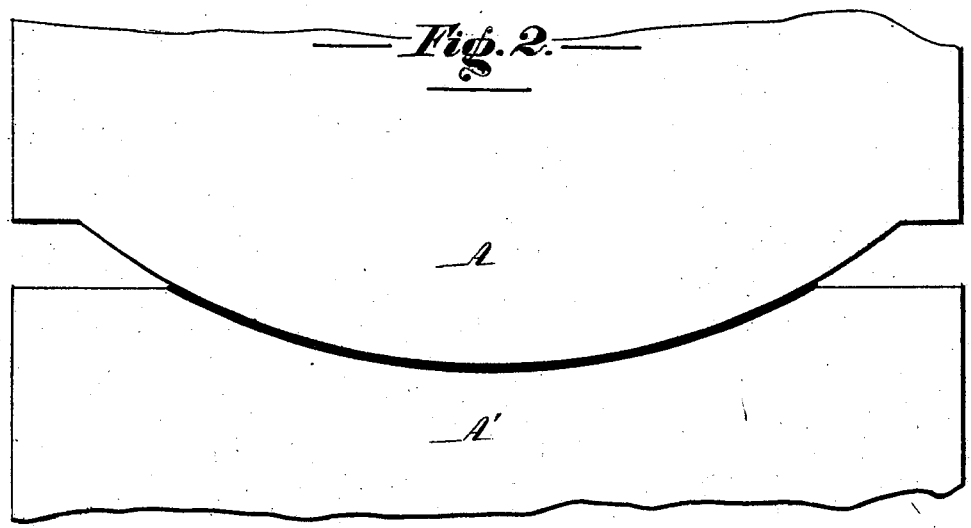

Figure 1 is a face view of the saw-blade, and
Figure 2 a diagram illustrating my process.

General Description.

In making concavo-convex saws, which are extensively used in the manufacture of barrels, &c., it has been the practice to reduce a flat blade to the desired shape by hammering it—a most tedious and expensive operation.

In practicing my process I first make an ordinary flat circular saw, with the necessary teeth on the edge and the usual central hole.

This toothed blade I then heat in a suitable furnace, and in its heated state subject it to the action of dies A and A', fig. 2, the former having a convex face, and the latter having a corresponding concavity, and suitable pressure being imparted to the upper die.

Before the hot blade is subjected to these dies, however, the latter should be heated to such a degree that, when brought into contact with the blade, they cannot chill the surface of the same.

The desired shape having been imparted to the blade, the next part of the process is that of hardening, which may be accomplished in the usual manner, that is, by immersing the blade while it is at the proper heat in water, oil, or other liquid.

After this the blade has to be subjected to the last process, that is, tempering or depriving the steel of its brittle character, by reheating to a given temperature. This I effect by dies similar to those used in the first instance for imparting the concavo-convex shape to the blade, the dies being properly heated so as to impart the desired temper.

In the preliminary hardening of the blade the latter is apt to become more or less distorted, but the distortions are removed by tempering the blade between dies of the shape which the blade has to assume; in fact, a concavo-convex saw-blade manufactured according to my process is not only cheaper, but more uniformly true throughout, than such as are made by the hammering process.

Claim.

I do not desire to claim separately any of the operations which constitute my process; but

I claim—

The process of manufacturing concave circular saws by the whole series of operations described and in the following order, namely, cutting the teeth and central opening in a circular plate of steel, heating said plate, compressing the same between heated dies, hardening it, and then tempering between heated dies, as set forth.

In testimony whereof, I have signed my name to this specification in the presence of two subscribing witnesses.

THOMAS S. DISSTON.

Witnesses:
A. H. SHOEMAKER,
H. HOWSON.